April 5, 1960     K. LEIST     2,931,887
TUBE ARRANGEMENT
Filed Oct. 1, 1956     2 Sheets-Sheet 1
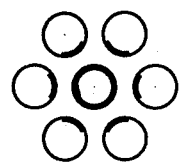
Fig. 1
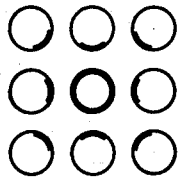
Fig. 2
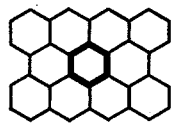
Fig. 3
Fig. 4
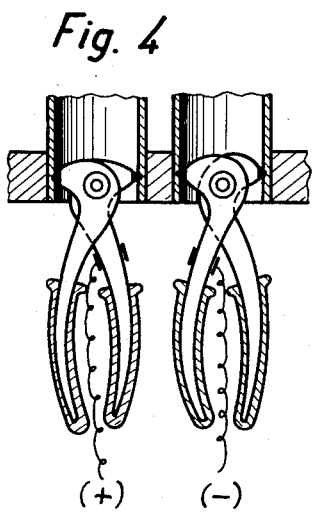
(+)    (−)
Fig. 5
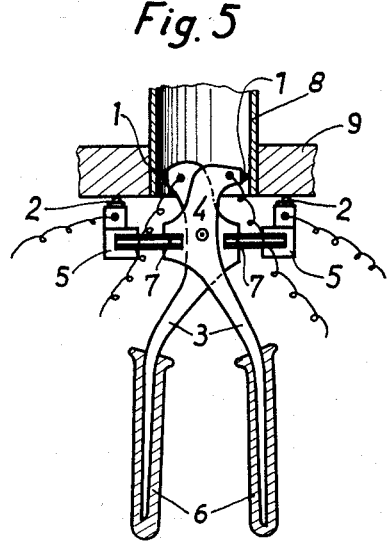
Inventor
Karl Leist Inventor
Karl Leist

United States Patent Office 2,931,887
Patented Apr. 5, 1960

2,931,887
TUBE ARRANGEMENT
Karl Leist, Aachen, Germany

Application October 1, 1956, Serial No. 613,342

7 Claims. (Cl. 219—107)

This invention relates to an improved and simplified method of and device for joining tubes by welding to plates or to adjacent tubes.

In connection with many mechanical installations, especially with heat exchangers of various types it is frequently necessary to join the ends of a large number of tubes to a plate common thereto and to join said ends tightly and quickly to each other. Heretofore, the ends of tubes arranged parallel to each other were joined partly by soldering after they had been expanded into square or hexagonal shape. The fastening of nests of tubes to plates is generally carried out by expanding the ends of the tubes or by manually welding the same to the plate. The different thickness of tube and plate renders the welding difficult and requires particularly complicated welding methods. To complete such joints tightly requires a considerable time and labor, especially if such work is to be carried out with relatively thin tubes or if tubes are involved which are intended for high temperatures.

It is, therefore, an object of the present invention to provide a method of and device for an improved and simplified joining of tubes to each other and to plates or headers, which will overcome the above mentioned drawbacks.

It is also an object of this invention to provide an improved and simplified method of and device for joining tubes by welding which can easily and effectively be carried out and handled respectively.

These and other objects and advantages of the invention will appear more clearly from the following specification in connection with the accompanying drawings, in which:

Figs. 1, 2 and 3 show the ends of tubes and their arrangement relative to each other prior to the joining of said ends to a plate or header or to each other.

Fig. 4 shows means according to the invention for carrying out the joining of tubes to a plate.

Fig. 5 illustrates a modified tool for joining the end of a pipe to a plate.

Figure 6:
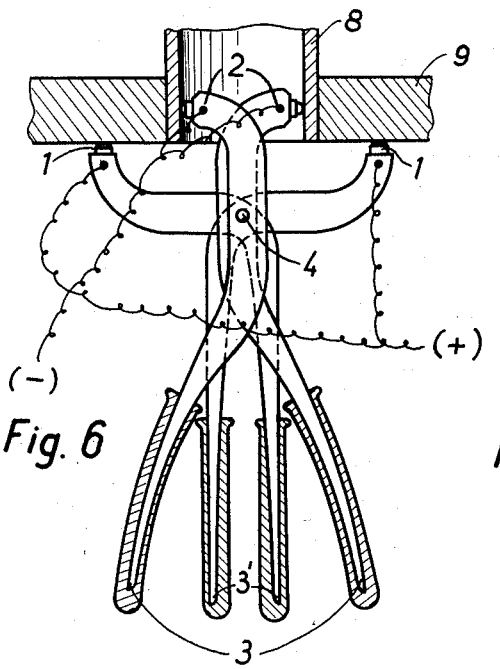
Figs. 6 and 7 illustrate in front view and side view respectively and partially in section plier-shaped tools for carrying out the method according to the invention.

The method according to the present invention is characterized primarily in that the wall of the respective tube is connected with the cylindrical inner surface of a bore of the plate to be connected thereto or with the wall of an adjacent pipe by means of an electric resistance welding operation, especially by spot welding or continuous seam welding or by electric arc welding. In order to be able at the same time to obtain a tight connection, when employing spot welding, the spots have to be placed correspondingly close to each other and may overlap each other.

Spot welding normally requires that both or a plurality of layers to be joined together are pressed against each other between two welding electrodes. Such electrodes may be designed as hook electrodes and may for instance be introduced into two adjacent tubes so that the tube walls within the area in which said tubes face each other can be welded like two metal sheets upon that portion of the plate which is located between the pipes. Inasmuch as between each pair of pipes certain wall portions of the pipes can be welded together, it will be evident, particularly with reference to Figs. 1 and 2 an entirely or almost completely coherent welding seam can be obtained. The spot and continuous seam welding is particularly simple if in conformity with Fig. 3 the ends of the pipes have been expanded for instance into hexagonal shape and have been arranged in the manner of honeycombs so that each two adjacent pipe ends have a certain portion thereof in direct engagement with each other.

The pressing together of the two surfaces to be welded in conformity with the present invention may be obtained with round tubes when substantially precisely fitting the pipes into the bores of the plate by expanding the pipes within or beyond the limit of elasticity. It would also be possible to rest spreader pliers against opposite wall portions of the tube. Counter electrodes may correspondingly be introduced into an adjacent tube or simultaneously or subsequently into a plurality of adjacent tubes or may be pressed against the end face of the plate outside of the pipe end extended through the plate.

Fig. 4 illustrates by way of example an arrangement in which two pliers are introduced into two adjacent pipes. The jaws facing each other of the two pliers which in each pipe rest against the oppositely located wall when pulling the handles of the pliers toward each other serve as electrodes and are supplied with current. If the pliers individually or coupled together automatically rotate about the axis of the pipe, a considerable portion of the pipe circumference will be welded together by a continuous welding seam before one of the two pliers is placed into the next hole or a plier in the next hole has to be provided with current. If desired, the current supply may be automatically controlled in conformity with the respective thickness of the intermediate wall.

Fig. 5 illustrates an embodiment of a welding plier in which by pulling the welding arms 3 provided with insulating handles 6 toward each other, two positive electrodes 1 are pressed against the inner wall of the pipe 8. The pivot point about which the two plier arms are pivoted is designated by the reference numeral 4. Both arms have inserted thereto a somewhat elastic member 7 which serves as a compensating element for the pressure exerted simultaneously upon the positive electrode 1 and negative electrode 2 through the intervention of the handles 6 and the inner surface of the pipe 8 and end surface 9 of the plate. The electrode handles for the electrodes 2 are in each arm insulated against the intermediate portions of the arms connected to the positive electrode 1. This is effected by insulating intermediate members 5.

Figure 7:
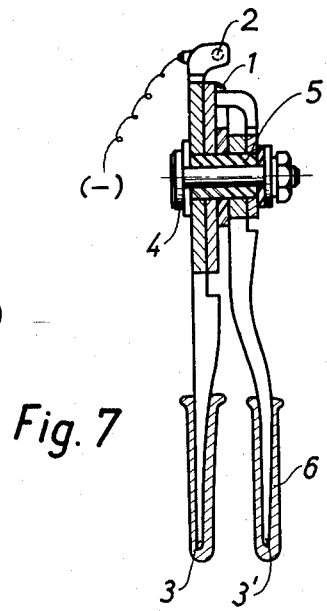

According to the arrangement of Figs. 6 and 7, two pliers are employed the arms of which are insulated against each other and are tiltable about the same axis while one of said pliers for instance the one introduced into the pipe has both arms provided with negative electrodes, whereas the other plier which presses from the outside against the end face carries the positive electrodes. After the electrodes have been clamped fast in the pipe, by means of the second pliers the two outer electrodes may be pressed against the outer surface. In Figs. 6 and 7, the positive and negative electrodes have been designated with the reference numerals 1 and 2 respectively, whereas the arms of one electrode are designated with the reference numeral 3 and the arms of the other electrode are designated with the reference numeral 3'. The pivot common to said electrodes is designated with the reference numeral 4 while the reference numeral 5 indicates an insulating sleeve and the reference numeral 6 designates insulated handles. The pipe to be connected with the plate 9 is designated with the reference numeral 8. If the electrodes at their contact points with the walls are equipped with corresponding sliding means such as rollers, by rotating said pliers about the longitudinal axis of the respective pipe a continuous seam can be obtained.

It is also possible by driving a mandrel 10 with a bulged portion 10a into a cylindrical tube end (Fig. 8) or into two adjacent tube ends to obtain a proper welding zone for the pipe, i.e. a small zone which will assure an intensive contact as it is necessary for spot welding. A similar effect may also be obtained by expanding the pipe end in a somewhat cone-shaped manner by a mandrel 11 (see Fig. 9). The welding zone may be marked by an abutment edge on the mandrel and, if necessary, by limiting the welding time, the welding may be effected along the entire circumference of the mandrel in which instance a plurality of counter electrodes would have to be arranged at appropriate points in adjacent tubes or on the end face of the plate, or the mandrel may be so designed that along the circumference a plurality of insulated segmental discs or lamellae are designed as electrodes while the individual points would be welded simultaneously or successively. For purposes of obtaining a continuous welding seam, a certain turning of the mandrel about its axis may be effected. Also in this instance, the counter electrodes are to be mounted in the manner described above either in adjacent pipes or on the end surface of the plate.

Figure 8:
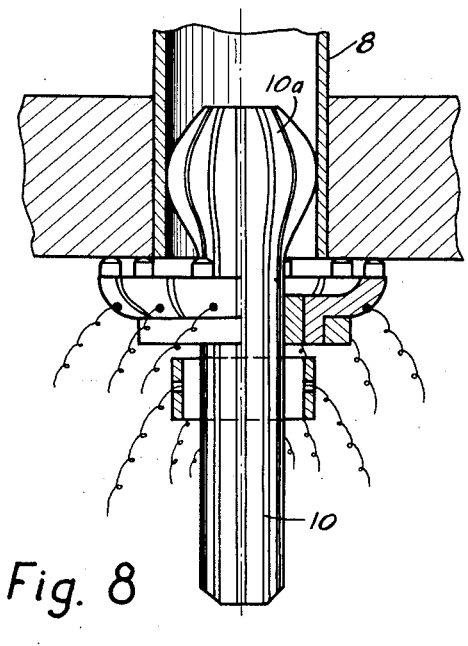
Figs. 8 and 9 illustrate further devices according to the invention for carrying out the improved method according to the invention.
Figure 9:
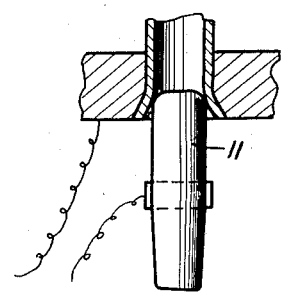

According to Fig. 8, the counter electrode is slipped over the mandrel in the way of a bell insulated with regard to said mandrel and may be screwed thereto. The counter electrode rests against the end surface of the plate. If in order to avoid too strong currents, the circumferential portion of the two electrode bodies is subdivided into sector discs insulated with regard to each other, the current supply to the respective electrode pairs pertaining to each other may be shifted from disc to disc and, if desired, automatically. For purposes of clamping the tube end against the plate, the mandrel may be designed as an expandable mandrel.

A further possibility of materializing the essence of the present invention consists in carrying out the welding operation by arc welding. In this instance, if desired in a protective atmosphere, one welding electrode only is employed and the heating necessary for the welding operation is produced by means of a welding pistol. By moving the welding pistol around the inner circumferential portion of the pipe, the row of dots can be converted into a continuous welding seam.

In many instances it is advisable prior or in addition to the above mentioned welding in the bore of the plate, to effect a mechanical widening of the pipe end or to supplement the seal by filling in the joint with suitable putty or solder which can be distributed for instance in a shielding furnace in a manner known per se.

It is, of course, to be understood that the present invention is, by no means, limited to the particular showing of the drawings but also comprises any modifications within the scope of the appended claims.

What I claim is:

1. An electrode arrangement for use in connection with resistance welding of tube ends to a plate, which comprises: a first arm having a bent top end portion, a second arm having a bent top end portion, said two top end portions extending in opposite radial directions with regard to each other, a first and a second electrode point respectively mounted on the radially outer ends of said top end portions, and pivot means intermediate said top end portions and the bottom end portions of said arms for pivotally interconnecting said arms in a plier-like manner, those arm portions between said pivot means and said bottom end portions being bent in opposite direction with regard to each other whereby said top end portions can be introduced into tube ends of different diameters and can exert substantially radial pressure upon the inner wall surface of the respective tube end.

2. An electrode arrangement according to claim 1, which includes a second pair of arms pivotally interconnected by said pivot means in a plier-like manner, said arms respectively carrying bent head portions in form of radially oppositely directed arms, additional contact points carried by the outer ends of said last mentioned head portions for contact with an end surface of a plate to which a tube is to be joined, the radial extension of said arms exceeding that of the top end portions of said first and second arms, the lower ends of said second pair of arms being bent in opposite direction to each other.

3. An electrode arrangement for use in connection with resistance welding of the tube ends to a plate, which comprises: electrode means having handle means for manually holding said electrode means and also having a head portion for insertion into tube ends of different diameters, said head portion of said electrode means being elastic for automatically adapting themselves to various inner diameters of the tube ends into which said head portion is inserted for contact therewith, the contact portions of said electrode means with an inner surface of a tube to be contacted thereby being considerably less than the inner surface area of the tube end which may be contacted by the head portion of the electrode means to be introduced in said tube.

4. An electrode arrangement according to claim 3, in which said head portion comprises a plurality of outwardly curved lamellae giving said head portion a bulbous contour.

5. An electrode arrangement according to claim 4, which includes additional electrode means surrounding said handle means and insulated therefrom for contact with the outside end surface of a plate to which a tube end is to be joined, said additional electrode means having a radial extension exceeding the maximum radial extension of said head portion.

6. An electrode arrangement for use in connection with resistance welding of a tube end to the wall of a bore in a plate, which comprises first electrode means of one polarity, said first electrode means having handle means for holding said electrode means and also having a head portion insertable into said tube end for exerting radially outwardly directed pressure upon said tube end, and second electrode means of another polarity arranged laterally of said first electrode means for electric contact engagement with that end face of said plate which is adjacent said handle.

7. In a resistance welding arrangement for welding a tube end to the wall of a bore in a plate: first unipolar electrode means having handle means for holding said electrode means and also having a head portion for engagement with the inner wall of said tube end, and for exerting radially outwardly directed pressure upon said tube end, and second electrode means having a polarity different from that of said first electrode means and being in electric contact engagement with said plate.

References Cited in the file of this patent
UNITED STATES PATENTS

| | | |
|---|---|---|
| 1,008,628 | Brown | Nov. 14, 1911 |
| 1,305,078 | Dyer | May 27, 1919 |
| 1,499,172 | Greenslade et al. | June 29, 1924 |
| 1,538,590 | Randles | May 19, 1925 |
| 1,578,019 | Ellis et al. | Mar. 23, 1926 |
| 1,846,438 | Richter et al. | Feb. 23, 1932 |
| 1,889,991 | Larsen | Dec. 6, 1932 |
| 1,949,251 | Gilbert | Feb. 27, 1934 |
| 2,057,017 | Ganahl | Oct. 13, 1936 |
| 2,139,499 | Howie | Dec. 6, 1938 |
| 2,583,665 | Pilia | Jan. 29, 1952 |
| 2,614,198 | Avery et al. | Oct. 14, 1952 |
| 2,743,342 | Bettis et al. | Apr. 24, 1956 |